UNITED STATES PATENT OFFICE.

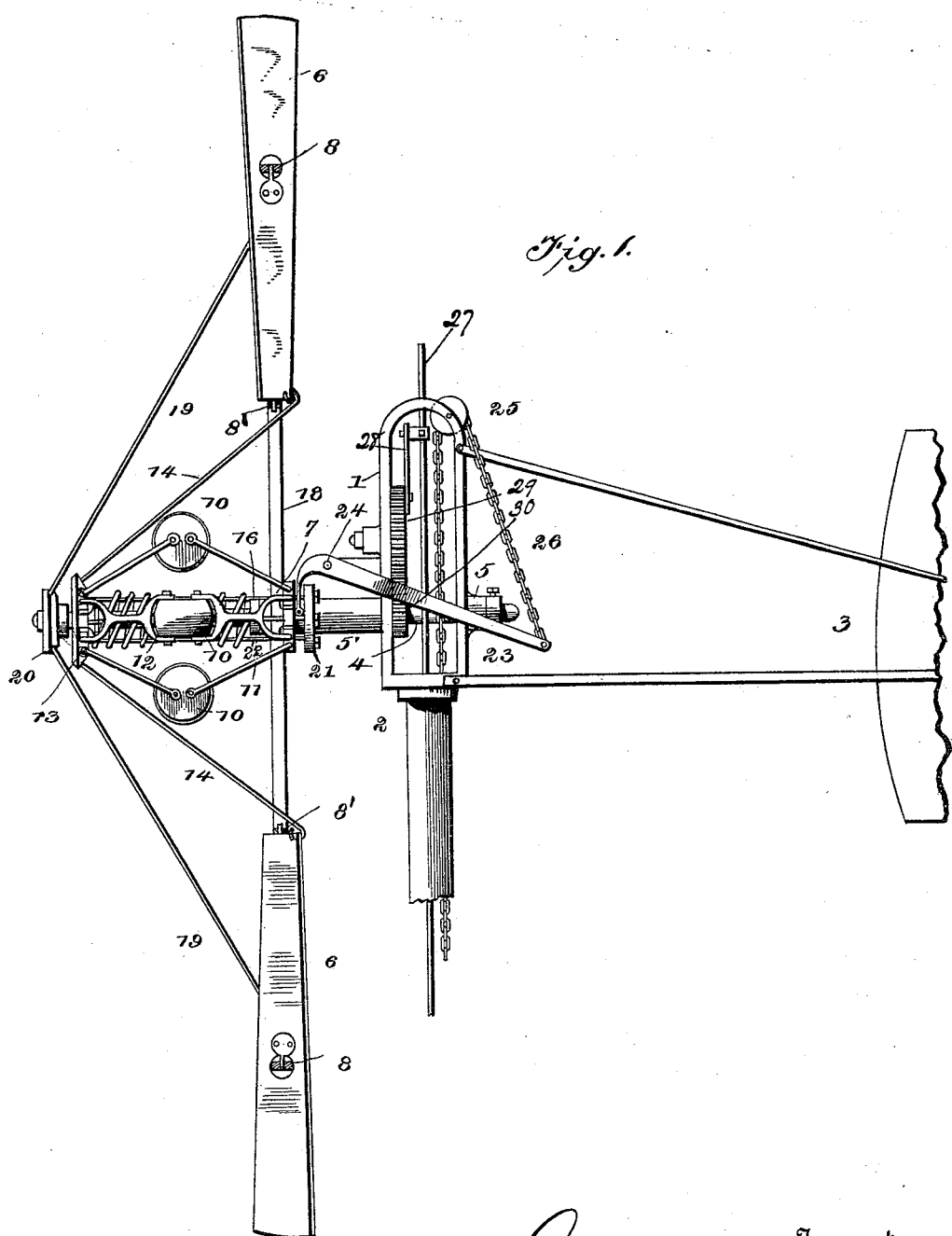

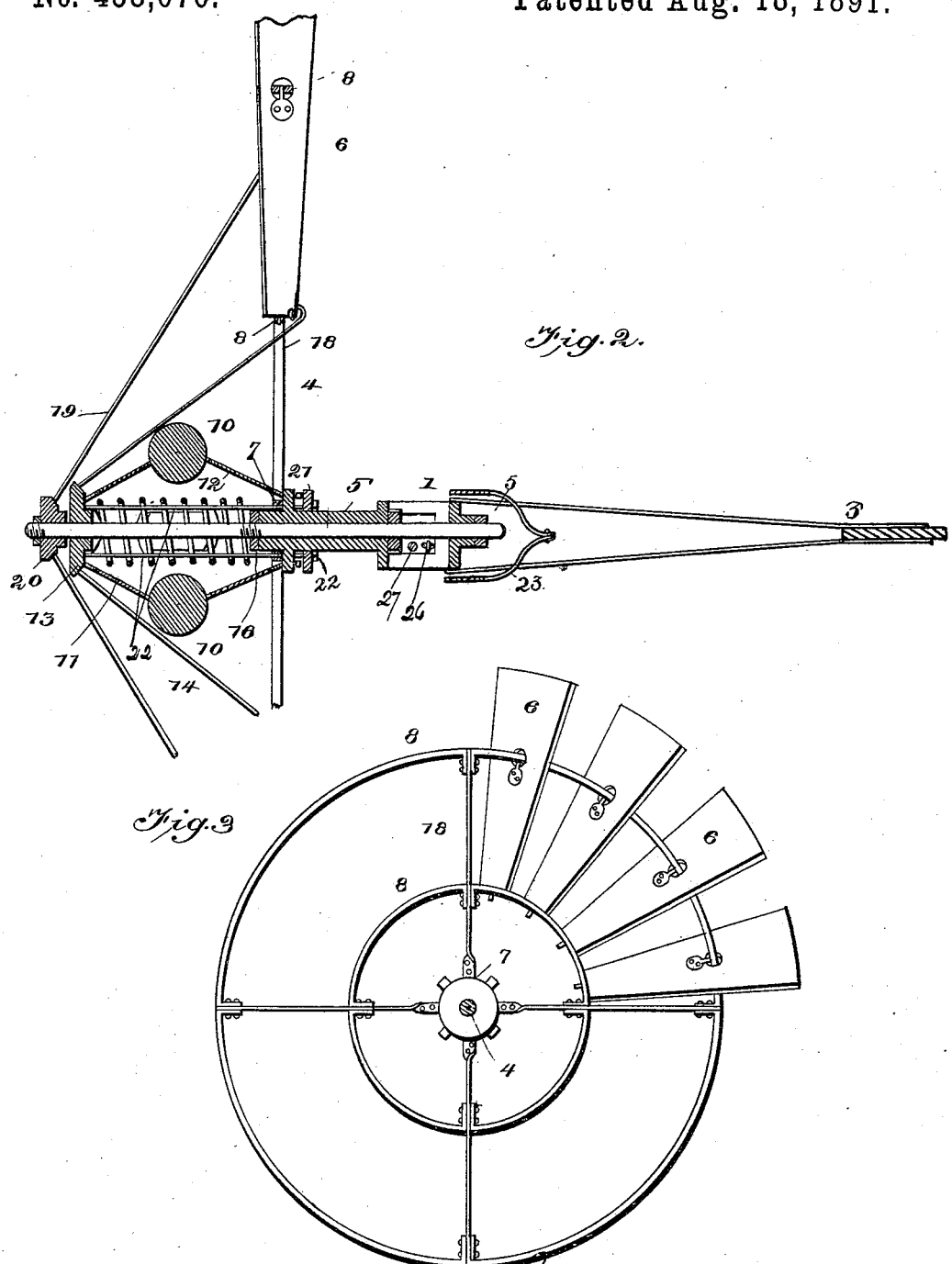

SAMUEL E. RUSK, OF HAINES FALLS, NEW YORK.

WIND-ENGINE.

SPECIFICATION forming part of Letters Patent No. 458,070, dated August 18, 1891.

Application filed May 20, 1891. Serial No. 393,461. (No model.)

*To all whom it may concern:*

Be it known that I, SAMUEL E. RUSK, a citizen of the United States of America, residing at Haines Falls, in the county of Greene and State of New York, have invented certain new and useful Improvements in Wind-Engines, of which the following is a specification, reference being had therein to the accompanying drawings.

My invention relates to certain improvements in wind-engines; and it consists in the novel construction and combination of parts, as hereinafter set forth, and pointed out in the claim.

In the accompanying drawings, Figure 1 is a broken side view of my improved wind-engine. Fig. 2 is a horizontal section thereof, and Fig. 3 is a contracted detached view of the wind-wheel.

In the embodiment of my invention I mount in the usual manner—as, for instance, upon a tower or supporting-frame (not shown)—the yoke-like frame 1, carrying at its lower end the tubular shaft 2 and having connected thereto the vane 3. The wind-wheel shaft 4 is suitably journaled in the frame 1 in Babbitt-metal boxes 5 5', integral with said frame. Secured to the shaft 4 is the spider 7, from which radiate the spokes or arms 18 of the wind-wheel, connected together by an outer, preferably sectional, rim or ring 8 and an inner similar ring 8', carrying the wings or sails 6 6, axially pivoted thereon. The arms or spokes 18 are braced in position by rods 19, connected thereto at one end and having their opposite ends connected to a collar 20, secured upon the outer end of the shaft 4, and to the inner edges of the sails or wings 6 is connected by rods 14 a sliding collar 13, fitting on the shaft 4. Also arranged on the shaft 4, between the collar 13 and a nut 16, screwed on said shaft, is a coiled spring, and by means of the nut 16 the tension of said spring is capable of adjustment according to the amount of resistance it is desired to give the sails or wings to the action or force of the wind.

The angular presentation of the wings or sails 6 to the wind as the wheel is rotated or driven by the wind is controlled, according to the speed required, by means of the centrifugal governor comprising the balls or weights 10, arranged between the spider 7 and the collar 13 and carried by rods 11 and 12, connected to the lugs of said sleeve and passing through said spider, respectively. This arrangement provides for preventing the too rapid motion of the wheel under high winds, while the yielding or flexing action of the spring will permit the wheel when subjected to gusts to gradually go into operation, thus preventing the jerking and the liability of the breaking of the mechanism.

23 is a lever pivoted at 24 to a bracket on the frame 1 and having the arms of its bifurcated end provided with rolls adapted to engage a ring 21, sliding on the box 5' and connected by rods 22 to the sliding collar 13, whereby the operator can, by pulling on a chain or line 26, connected to said lever and passing over a pulley 25 upon the frame 1 and down through the tube 2, throw the wheel out of operation when desired.

The pump-rod 27, which extends down through the tube 2, has connection by a crank 28 and gearing 29 30 with the shaft 4 for its reciprocation.

Having thus fully described my invention, I claim—

The wind-engine combining the shaft carrying the wheel provided with the wings or sails axially pivoted in position, the sliding collar, also carried by said shaft and having rod connection with said sails or wings and having connected to it guide-rods passing through the spider of the wheel, the spring coiled around said shaft and exerting its pressure against said collar, and the centrifugal governor comprising the arms or rods pivoted or connected to said collar and spider at their outer ends and carrying the balls or weights arranged equidistantly of said collar and spider, substantially as set forth.

In testimony whereof I affix my signature in presence of two witnesses.

SAMUEL E. RUSK.

Witnesses:
E. W. LEAVENWORTH,
JAMES F. SUTTON.